UNITED STATES PATENT OFFICE.

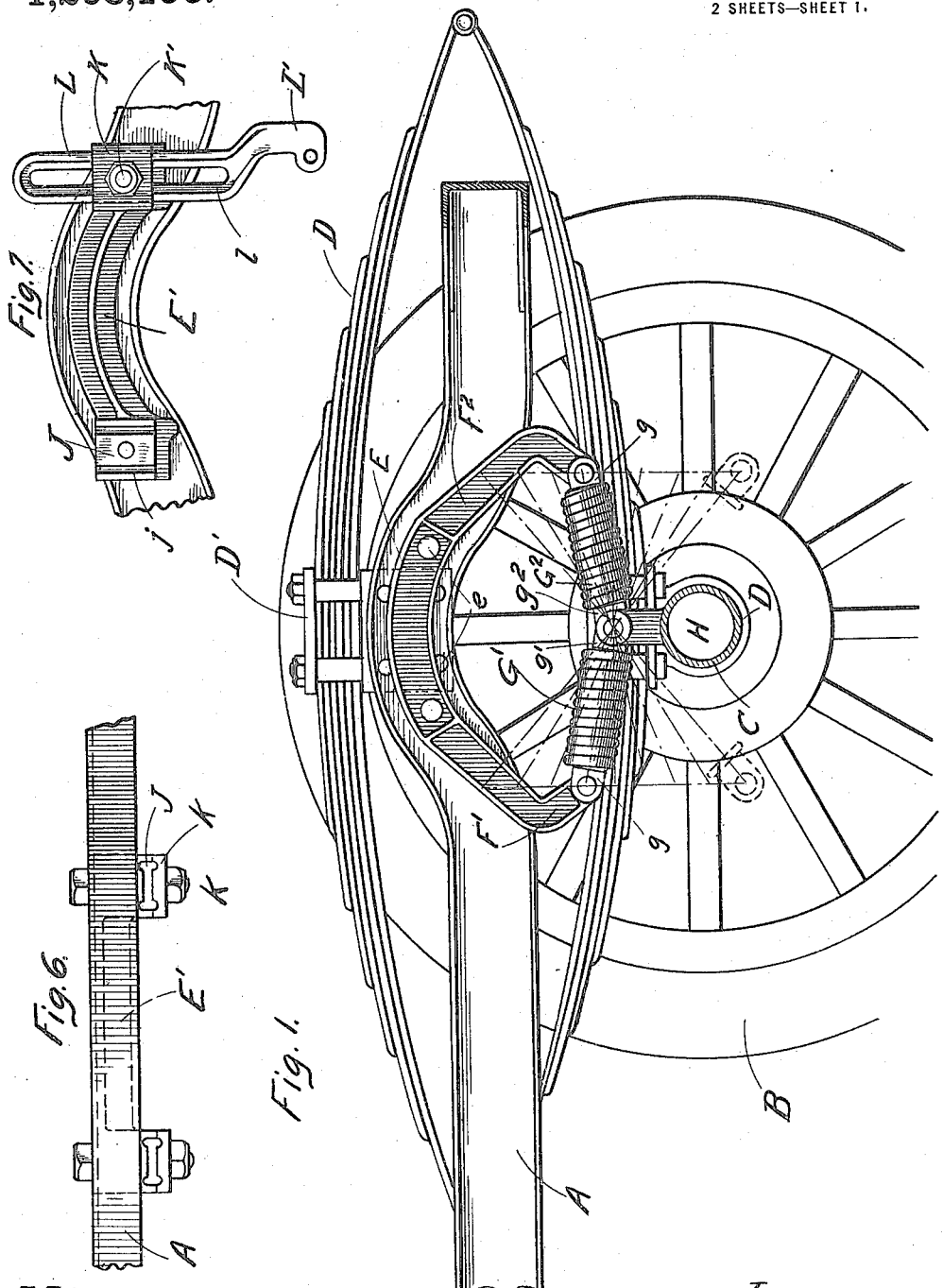

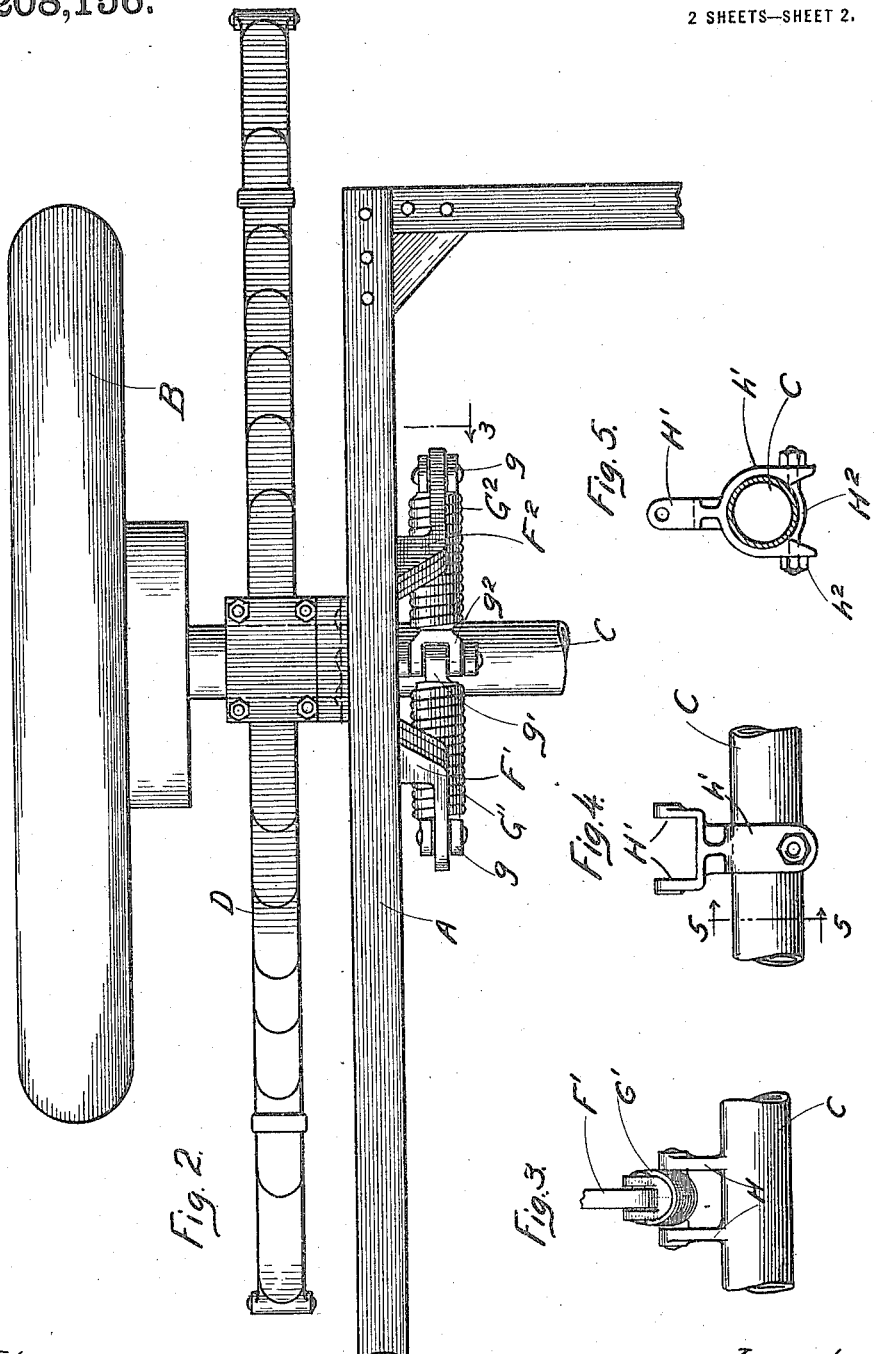

PHILLIP HIEN, OF CHICAGO, ILLINOIS.

AUXILIARY VEHICLE-SPRING.

1,208,156.

Specification of Letters Patent. Patented Dec. 12, 1916.

Application filed December 7, 1911. Serial No. 664,384.

*To all whom it may concern:*

Be it known that I, PHILLIP HIEN, a citizen of the United States, residing at Chicago, in the county of Cook, and State of Illinois, have invented certain new and useful Improvements in Auxiliary Vehicle-Springs, of which the following is a specification.

My invention relates in general to vehicle springs, and more particularly to auxiliary springs for stiffening the usual vehicle springs when subjected to excessive compression and for dampening their recoil.

Vehicle springs, and more especially automobile springs, of the requisite resiliency for easy riding over roads of ordinary evenness are entirely too flexible to protect the occupants of the vehicle from a sudden jolt incident to the wheel dropping into an unusually deep rut or hitting a large stone or other obstruction, as under such conditions the springs close and immediately recoil, often throwing the occupants of the vehicle from their seats. On the other hand, if the springs are so stiff as not to close under usual road conditions, they are not resilient enough under ordinary road conditions to make the vehicle easy riding.

It has heretofore been proposed to provide shock absorbers to reinforce vehicle springs, particularly automobile springs, but they have not proved practical and satisfactory in use, either because they stiffen the usual springs too much for easy riding over ordinary roads, or because they require frequent adjustment to compensate for wear, or because they are too complicated or inherently too weak to withstand hard usage.

The primary object of my invention is to provide an auxiliary spring device for supplementing the usual springs of an automobile or other vehicle, which will stiffen the usual springs under excessive compression and will dampen their recoil, but which will not interfere with the resiliency of the usual springs under normal road conditions.

A further object of my invention is to provide a supplemental spring for automobiles, or other vehicles, which will be normally inactive, but which will gradually retard the compression, and also the recoil, of the usual vehicle springs, the degree of such retardation increasing in proportion to the extent of compression or recoil of the usual springs.

A still further object of my invention is to provide a reinforcing device for vehicle springs which will be simple in construction, inexpensive in manufacture, and efficient in use.

My invention will be more fully described hereinafter with reference to the accompanying drawings, in which the same is shown as embodied in a convenient and practical form, and in which—

Figure 1 is a side elevational view of my improved device applied to an automobile, only portions of the automobile being shown which are necessary to a complete disclosure of my invention; Fig. 2, a plan view of the parts shown in Fig. 1; Fig. 3, a detail view looking to the right from the line 3, 3, Fig. 2; Fig. 4, a detail view of the axle bracket when made separate from the axle; Fig. 5, a sectional view on line 5, 5, Fig. 4; Fig. 6, a plan view of a portion of the side frame of the automobile, showing a modified form of attachment; and Fig. 7, an elevational view of the modification shown in Fig. 6.

The same reference characters are used to designate similar parts in the several figures of the drawings.

Reference character A indicates a portion of the side frame of an automobile chassis, the portion shown being that adjacent one of the rear wheels.

B indicates one of the wheels of the automobile and C the rear axle.

D indicates one of the elliptical springs interposed between the rear axle adjacent one end thereof and the adjacent portion of the chassis frame. Suitable attaching means D' secure the top of the elliptical spring to the chassis frame, while other suitable attaching means $D^2$ secure the lower half of the elliptical spring upon the axle. Neither the form of the elliptical spring nor its attaching means constitute parts of my improvement, and it will be understood when my improvement is described in detail that it may be applied to any usual form of vehicle or automobile, whether having full elliptical springs, half elliptical springs or any other suitable springs interposed between the axles and chassis frame or vehicle body.

E indicates a bracket comprising a central portion adapted to fit within and to be rigidly secured to the portion of the chassis frame A over the rear axle. Any suitable means may be provided for securing the bracket E to the chassis frame, such, for instance, as bolts *e*. The end portions F', $F^2$ of the bracket E are offset laterally, as shown in Fig. 2, and depend downwardly, as indicated in Fig. 1, the lower ends of the parts F', F² terminating above the plane of the axle at approximately equal distances from the axle.

G', G² designate coil springs, the outer ends of which are pivotally connected to the lower ends of the parts F' and F² of the bracket E, while the inner ends of the springs G', G² are pivotally connected to the upper end of a bracket H rigidly secured to and projecting upwardly from the axle C. The outer end of each of the springs G', G² preferably surrounds and is secured to a plug $g$ which is provided with a pair of ears which straddle the lower end of the adjacent depending portion F' or F² of the bracket E, a pivot pin extending through alined holes in the ears of the plug $g$ and interposed part of the bracket. As a convenient means for pivotally connecting the inner ends of the springs G' and G² to the bracket H, I have shown plugs $g'$ and $g^2$ which are surrounded by and secured to the inner ends of the respective springs. One of the plugs, as, for instance, $g'$, is provided with a single ear which lies between two spaced ears on the plug $g^2$. The overlapped ears on the plugs $g'$, $g^2$ fit between the two portions of the bracket H, as shown in Fig. 3.

The two-part bracket H may be cast integrally with the rear axle C, or when my improved device is to be attached to an automobile, or other vehicle, the rear axle of which has not been cast with the brackets H thereon, a detachable bracket H' is provided which has a U-shaped portion $h'$ adapted to straddle the axle C and to be clamped thereon by a metallic strap H² underlying the axle and extending through holes in the depending ends of the U-shaped portion $h'$. Nuts $h^2$ engage the ends of the strap H² which project through the lower ends of the bracket, thereby permitting the bracket to be readily attached to the rear axle of an automobile and at the same time insuring the rigid engagement of the bracket with the axle.

In Figs. 6 and 7 I have shown a modified form of bracket for attachment to the chassis frame of automobiles already constructed in order that the depending ends of the bracket may be so adjusted as to occupy the desired relation to the axle. In these views E' indicates a bracket which fits within the upper and lower flanges of the chassis frame A. The ends of the bracket E' are provided with blocks J, J, each provided with a pair of vertical grooves $j$. The blocks J are of a width to project slightly beyond the inner edges of the flanges of the frame A. A plate K having a pair of grooves $k$ adapted to register with the grooves $j$ in one of the blocks J, is adjustably secured to one of the blocks J by means of a bolt K' extending through the plate, corresponding block, and web of the frame A. A nut on the end of the bolt K' permits removal of the plate K.

Clamped between each block J of the bracket E' and the corresponding plate K is a bracket L having a central slot through which the bolt K' passes and also having parallel vertical flanges $l$ which fit within the spaced grooves $j$, $k$ in the opposing surfaces of the corresponding block J and plate K. The lower end of the bracket L is provided with an ear L' adapted to fit between and be pivotally connected to the ears of the plug $g$ to which the corresponding spring G' or G² is secured. A bracket L is of course adjustably secured to each of the blocks J so that the pair of brackets L may be vertically adjusted relatively to the frame A, and the lower ends of the brackets L, thereby located in proper positions relatively to the bracket on the axle.

The operation of my improved supplemental spring device is as follows: The relation between the lower ends of the portions F' and F² of the bracket and the upper end of the axle bracket H is such that when there is no load upon the vehicle, the springs G', G² will occupy the inclosed positions shown in Fig. 1. When the vehicle is subjected to its normal load, the usual vehicle springs, such as D, are compressed slightly, so that the pair of springs G', G² come into horizontal alinement, owing to the lower ends of the chassis bracket being depressed into horizontal alinement with the upper end of the axle bracket H. The auxiliary springs G', G² are consequently inactive when the vehicle carries its normal load and the usual vehicle springs are subjected to the compression incident to a normal load. During the travel of the vehicle over roads having only the ordinary unevenness the usual vehicle springs slightly compress and recoil without being appreciably stiffened by the auxiliary springs G' and G², as the relative movement of the lower ends of the bracket E and the upper end of the axle bracket H during the ordinary running of the vehicle over usual roads does not produce very great compression or recoil of the regular vehicle springs. When, however, the regular vehicle springs are subjected to excessive compression, as, for instance, when the wheel drops into a rut or hits a large obstacle, the lower ends of the bracket E move a considerable distance downwardly relatively to the upper end of the axle bracket H, thereby distending the springs G' and G², such distention increasing in proportion to the compression of the main vehicle spring, thereby exerting a gradually increasing resistance to the compression of the regular springs. When the regular vehicle spring has completed its compression and commences its recoil, immediately upon the lower ends of the bracket E passing above the horizontal plane of the top of the axle bracket H, the springs G' and G² commence to be distended, thereby dampening the recoil of the regular vehicle springs, such dampening effect increasing in degree in proportion to the extent of the recoil of the regular vehicle springs.

From the foregoing description, it will be observed that I have invented an improved device for reinforcing the usual springs of a vehicle, and more particularly an automobile, whereby excessive compression of the vehicle springs is retarded, and also the excessive recoil thereof retarded, without interfering with the resiliency of the regular vehicle springs when traveling over normal roads. It will be further evident that my improved device may be applied to vehicles when made, or may be applied to vehicles already in use in a simple and convenient manner.

While I have illustrated and described my improvement as applied to a vehicle, yet it will be understood that it may be used to reinforce springs interposed between any two relatively movable members, and while I have described more or less in detail the specific form in which I have illustrated my invention as embodied, yet I do not wish to be understood as limiting myself thereto, as I contemplate changes in form, proportion of parts, and substitution of equivalents, as circumstances may require, or as may be deemed expedient.

I claim:

1. The combination with a vehicle comprising relatively movable parts and interposed springs, of a coiled spring shock absorbing device for supplementing the action of the vehicle springs, and means for connecting said device to the relatively movable parts of the vehicle to render said device inactive when the vehicle springs are in normal position under predetermined load and for subjecting the coiled springs of said device to a gradually increasing tension, both upon the compression and recoil of the vehicle springs thereby exerting a gradually increasing resistance both to the compression and recoil of the vehicle springs from their normal position under predetermined load.

2. The combination with a vehicle comprising relatively movable parts and interposed springs, of a device for supplementing the action of the vehicle springs comprising a pair of auxiliary springs in substantial horizontal alinement when the vehicle contains a predetermined load, and means for securing said springs at their outer ends to one of the relatively movable parts of the vehicle and at their inner ends to the other of the relatively movable parts of the vehicle, whereby the ends of said auxiliary springs are relatively vertically moved and the auxiliary springs thereby placed under a gradually increasing tension as the vehicle springs are compressed and also as the vehicle springs recoil.

3. The combination with a vehicle comprising a body, axles, and springs interposed between the body and axles, of a device for reinforcing said springs comprising a pair of auxiliary springs in substantial horizontal alinement when the vehicle contains a predetermined load, and means for securing said springs at their outer ends to the frame of the vehicle body and at their inner ends to an axle, whereby the ends of said auxiliary springs are relatively moved vertically and the auxiliary springs thereby placed under a gradually increasing tension as the vehicle springs are compressed and also as the vehicle springs expand.

4. The combination with a vehicle comprising relatively movable parts and interposed springs connecting said parts, of a shock absorbing device for supplementing the action of the vehicle springs comprising a pair of oppositely extending coil springs, means connecting the inner ends of said coil springs to one of the relatively movable parts of the vehicle, and means for connecting the outer ends of said coil springs to the other of the relatively movable parts of the vehicle, the relative positions of said two means placing said coil springs under tension when the vehicle is unloaded and brought into alinement without tension when the vehicle contains a predetermined load.

5. The combination with a vehicle comprising relatively movable parts and interposed springs connecting said parts, of a shock absorbing device for supplementing the action of the vehicle springs comprising a pair of oppositely extending coil springs, means connecting the inner ends of said coil springs to one of the relatively movable parts of the vehicle, means for connecting the outer end of said coil springs to the other relatively movable parts of the vehicle, and means for relatively adjusting the inner and outer ends of said coil springs so that the said springs will be relatively inclined when the vehicle is unloaded and will aline when the vehicle contains a predetermined load.

6. The combination of a vehicle comprising a body, axles and springs interposed between and connecting the body and axles, of a shock absorbing device for supplementing the action of the vehicle springs comprising a pair of oppositely extending coil springs, means for connecting the inner ends of said springs to one of the vehicle axles, and means for connecting the other ends of said auxiliary springs to the vehicle body, the horizontal planes of said two means relatively inclining said springs when the vehicle is unloaded and alining said springs when the vehicle contains a predetermined load.

7. The combination with a vehicle comprising a body, axles, and springs interposed between the body and axles, of a pair of shock absorbing coil springs located on opposite sides of one of the axles, and means connecting the opposite ends of said coil springs to said axle and to the frame of the vehicle body to support said springs in positions slightly diverging upwardly on opposite sides of the axle when the vehicle is unloaded and occupying substantially the same horizontal plane when the vehicle carries its normal load.

8. The combination with a vehicle comprising relatively movable parts and interposed springs, of a device for supplementing the action of the vehicle springs comprising a pair of normally auxiliary springs in substantial horizontal alinement when the vehicle contains a predetermined load, a bracket projecting from one of the relatively movable parts of the vehicle to which the inner ends of said auxiliary springs are directly secured, and a pair of brackets projecting from the other of the relatively movable parts of the vehicle to which the outer ends of said auxiliary springs are directly secured, whereby said auxiliary springs are normally inactive and are placed under a gradually increasing tension as the vehicle springs are compressed and also as the vehicle springs recoil.

In testimony whereof, I have subscribed my name.

PHILLIP HIEN.

Witnesses:
GEO. L. WILKINSON,
A. L. WALTON.

Copies of this patent may be obtained for five cents each, by addressing the "Commissioner of Patents, Washington, D. C."